(12) United States Patent
Lu et al.

(10) Patent No.: US 9,391,553 B2
(45) Date of Patent: Jul. 12, 2016

(54) HYBRID CONTROLLER FOR BRUSHLESS DC MOTOR

(71) Applicant: TEXAS INSTRUMENTS INCORPORATED, Dallas, TX (US)

(72) Inventors: Yisong Lu, Plano, TX (US); Ruochen Zhang, Pudong District (CN); Wei Zuo, Beijing (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 25 days.

(21) Appl. No.: 14/098,161

(22) Filed: Dec. 5, 2013

(65) Prior Publication Data

US 2015/0022129 A1    Jan. 22, 2015

Related U.S. Application Data

(63) Continuation-in-part of application No. PCT/CN2013/079780, filed on Jul. 22, 2013.

(51) Int. Cl.
*H02P 6/06* (2006.01)
*H02P 6/18* (2006.01)
*H02P 6/20* (2016.01)
*H02P 31/00* (2006.01)

(52) U.S. Cl.
CPC *H02P 6/20* (2013.01); *H02P 6/182* (2013.01); *H02P 31/00* (2013.01); *H02P 2207/05* (2013.01)

(58) Field of Classification Search
CPC ........................................................ H02P 6/182

USPC .................. 318/400.14, 400.35, 400.04, 701
See application file for complete search history.

(56) References Cited

U.S. PATENT DOCUMENTS

| 5,258,695 | A | * | 11/1993 | Utenick et al. | 318/400.34 |
| 5,594,322 | A | * | 1/1997 | Rozman et al. | 322/10 |
| 6,021,015 | A | | 2/2000 | Jeffrey et al. | |
| 6,285,521 | B1 | * | 9/2001 | Hussein | 360/73.03 |
| 6,555,977 | B1 | * | 4/2003 | Du | H02P 6/18 310/184 |
| 8,030,867 | B1 | * | 10/2011 | Allison, III | 318/400.35 |
| 8,125,170 | B2 | * | 2/2012 | Fahimi et al. | 318/400.35 |
| 8,610,391 | B1 | * | 12/2013 | Yang et al. | 318/437 |
| 2005/0201491 | A1 | * | 9/2005 | Wei | 375/326 |
| 2006/0132070 | A1 | * | 6/2006 | Heydt | G11B 19/28 318/400.14 |
| 2006/0152181 | A1 | * | 7/2006 | Shao et al. | 318/254 |
| 2006/0197482 | A1 | * | 9/2006 | Harwood | 318/439 |
| 2007/0164691 | A1 | * | 7/2007 | MacKay | 318/1 |

* cited by examiner

*Primary Examiner* — Eduardo Colon Santana
*Assistant Examiner* — Cortez Cook
(74) *Attorney, Agent, or Firm* — Daniel Chan; Frank D. Cimino (57) ABSTRACT

A circuit includes a processor that analyzes a pulse width modulated (PWM) signal feedback from a brushless DC motor to determine a transition between a mutual inductance zero crossing condition and a Back Electro Motive Force (BEMF) zero crossing condition of the brushless DC motor. A mutual inductance controller is executed by the processor to commutate the brushless DC motor at startup of the motor when the mutual inductance zero crossing condition is detected by the processor. A BEMF controller is executed by the processor to commutate the brushless DC motor after startup of the motor when the BEMF zero crossing condition is detected by the processor.

20 Claims, 5 Drawing Sheets

FIG. 7

HYBRID CONTROLLER FOR BRUSHLESS DC MOTOR

RELATED APPLICATION

This application is a continuation-in-part of PCT Patent Application Serial No. PCT/CN2013/079780, filed 22 Jul. 2013, which is incorporated herein in its entirety.

TECHNICAL FIELD

This disclosure relates to motor control circuits, and more particularly to circuits that activate different controllers based on the zero crossing operating conditions of a brushless DC motor.

BACKGROUND

A typical brushless DC motor has permanent magnets which rotate and a fixed armature, eliminating problems associated with connecting current to a moving armature as with brushed DC motors. An electronic controller replaces the brush/commutator assembly of the brushed DC motor, which continually switches the phase to the windings to keep the motor turning. The controller performs similar timed power distribution by using a solid-state circuit rather than the brush/commutator system.

Starting up a three-phase sensorless brushless DC (BLDC) motor based on a phase-center tap motor configuration is one of the major concerns for driver and controller design. For instance, problems with low back-electromotive force (BEMF) voltages at low speed can occur where it may not be reliable to use BEMF zero crossing for commutation, for example. To actuate the motor, one common prior technique utilizes open loop control at the start of motor operations until the BEMF voltage is adequate. A large variation on load inertia however could exceed the capability that open loop controls can manage and thus, leading to start-up failure. When pulse width modulation (PWM) is involved during start up, mutual inductance effects in the motor can mask BEMF voltages thus causing improper commutation and start up failure.

SUMMARY

This disclosure relates to control of a brushless DC motor. In one example, a circuit includes processor that analyzes a pulse width modulated (PWM) signal feedback from a brushless DC motor to determine a transition between a mutual inductance zero crossing condition and a Back Electro Motive Force (BEMF) zero crossing condition of the brushless DC motor. A mutual inductance controller is executed by the processor to commutate the brushless DC motor at startup of the motor when the mutual inductance zero crossing condition is detected by the processor. A BEMF controller is executed by the processor to commutate the brushless DC motor after startup of the motor when the BEMF zero crossing condition is detected by the processor.

In another example, a method includes sampling a pulse width modulated (PWM) signal on time and a PWM signal off time to determine a transition between a mutual inductance zero crossing and a Back Electromotive Force (BEMF) zero crossing of a brushless DC motor. The method includes enabling a mutual inductance mode to operate the brushless DC motor when the mutual inductance zero crossing of the brushless DC motor is detected. The method includes switching from the mutual inductance mode to a BEMF mode to operate the brushless DC motor when the BEMF zero crossing of the brushless DC motor is detected.

In yet another example, a circuit includes a monitor circuit to monitor a pulse width modulated (PWM) on signal and a PWM off signal representing a transition between a mutual inductance zero crossing and a Back Electromotive Force (BEMF) zero crossing of a brushless DC motor. A processor analyzes the PWM on signal and the PWM off signal from the monitor circuit and determine the transition between the mutual inductance zero crossing and the BEMF zero crossing of the brushless DC motor. A mutual inductance controller is activated by the processor to control the brushless DC motor when the mutual inductance zero crossing is detected. A BEMF controller is activated by the processor when the BEMF zero crossing is detected.

DETAILED DESCRIPTION

A circuit is provided for efficient closed-loop control of a brushless DC motor at start-up and beyond. The circuit activates different types of closed-loop controllers depending on detected mutual inductance conditions (e.g., zero crossing events) that are predominant at lower speeds of the motor and Back Electro Motive Force (BEMF) conditions that are predominant at higher speeds of the motor. The circuit includes a processor that monitors feedback from the DC motor to determine when the BEMF voltages are above mutual inductance voltages of the motor. Such determination can be based on detecting transitions on a floating winding of the motor when two windings are driven high and subsequently driven low via pulse width modulated (PWM) pulses. At lower speeds of the motor, when the mutual inductance is predominant over the BEMF voltages of the motor, the processor circuit activates a closed-loop mutual inductance controller based on mutual inductance zero crossing events and until sufficient BEMF has been generated. When the BEMF voltage has been detected greater than the mutual inductance voltage, then the processor circuit activates a closed-loop BEMF controller based on BEMF zero crossing events which continues thereafter during normal motor operations. By introducing a hybrid control at low and then high speed operations of the motor, closed loop control can be maintained throughout the operating cycle of the motor which mitigates open-loop control problems at lower speeds of the motor. Also, basic monitoring circuits can be employed that mitigate the need for expensive digital processing of analog signals to derive mutual inductance values from the motor.

Figure 1:
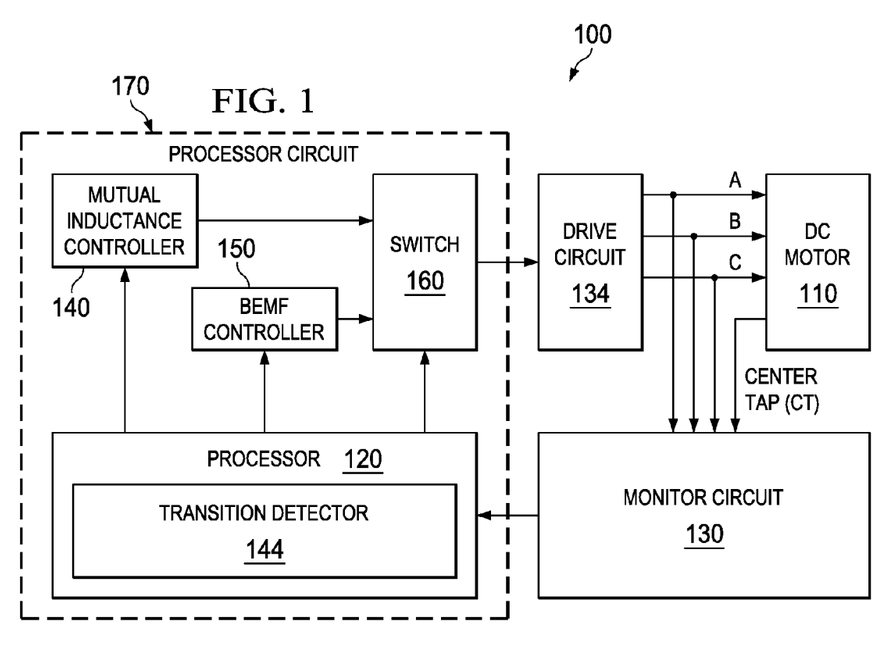
FIG. 1 illustrates an example of a circuit for control of a brushless DC motor.

FIG. 1 illustrates an example of a circuit 100 for control of a brushless DC motor 110. A processor 120 analyzes pulse width modulated (PWM) signal feedback received from the brushless DC motor 110 to determine a transition between a mutual inductance zero crossing condition and a Back Electro Motive Force (BEMF) zero crossing condition of the DC motor. The PWM signal feedback is generated by a monitor circuit 130 that monitors three phase winding connections (labeled A, B, and C) with respect to a center tap (CT) connection of the DC motor 110. In general, two of the windings of the motor are driven by a drive circuit 134 (pulsed high or low via PWM drive signal) and a third winding is left floating which is then monitored by the monitor circuit 130 with respect to the CT connection to generate feedback. Thus, during any given third of revolution of the motor, two of the windings are driven while a different winding (A, B, or C) may be floating and employed to detect position and/or speed of the DC motor 110. After a certain number of degrees of motor revolution, the polarity of voltage is reversed to a given pair of windings to provide commutation of the motor 110 and to continue angular motion in a given direction.

Motor position can be detected by monitoring zero crossing conditions of the floating winding via the monitor circuit 130. During initial start-up conditions of the motor 110, a mutual inductance controller 140 can be executed by the processor 120 to commutate the brushless DC motor 110 at startup of the motor when the mutual inductance zero crossing condition is detected by the processor. A transition detector 144 (e.g., counter) may be employed in the processor 120 to detect when BEMF conditions have overcome the mutual inductance conditions of the motor 110. For example, during low speed detection of a two pole pair DC motor 110, eight mutual inductance zero crossing events may be detected via the monitor circuit 130 per revolution of the motor. As the motor speed increases, the feedback from the motor changes where the BEMF voltage becomes greater than the mutual inductance voltage of the motor 110. When such transition occurs, four BEMF zero crossing events (in the two pole pair example) would be detected per revolution and then utilized thereafter to control speed and position of the motor 110.

In general, the feedback from the DC motor 110 includes a higher frequency mutual inductance voltage that modulates a lower frequency BEMF voltage. At low speeds, the amplitude of the BEMF voltage is low and the mutual inductance voltage riding on top of the BEMF voltage can be utilized for determining when to commutate the motor (e.g., change polarity of voltage to a given pair of windings). At higher motor speeds, when the amplitude of the BEMF voltage becomes greater than the mutual inductance voltage, then BEMF zero crossing events can be utilized for determining when to commutate the motor. As used herein, as zero crossing refers to when a rotor magnetic pole of the motor 110 and a motor pole boundary is aligned with the floating phase winding of the motor. Such positions of the motor 110 causes a received sinusoidal feedback voltage from the motor to cross a boundary referred to as zero cross. Thus, as the motor spins initially, zero crossing events from the mutual inductance component can be employed for commutation whereas at higher speeds, zero crossing events for BEMF can be employed for commutation. Generally, there are twice as many mutual inductance zero crossing events per revolution of the motor 110 than there are BEMF zero crossing events per revolution.

When the transition from the mutual inductance condition to the BEMF condition is detected by the transition detector 144, a BEMF controller 150 can be executed by the processor 120 to commutate the brushless DC motor 110 after startup of the motor when the BEMF zero crossing condition is detected by the processor. By operating separate controllers 140 (based on mutual inductance zero crossing) and 150 (based on BEMF zero crossing) over the lower and higher speed operating points of the DC motor 110, the circuit 100 can provide closed-loop stability over the entire operating range of the motor while efficiently determining position values without further requiring elaborate and expensive digital processing hardware. As shown, the processor 120 activates a switch 160 to enable the BEMF controller 130 and disable the mutual inductance controller 120 when the BEMF voltage is detected above the mutual inductance voltage of the DC motor 110.

The monitor circuit 130 receives the feedback from the motor 110 which can be based on sampling a pulse width modulated (PWM) on signal and PWM off signal from the floating winding of the DC motor 110. Such sampling provides a differential value related to the mutual inductance voltage for at least one phase winding of the DC motor 110. The PWM on signal and the PWM off signal can represent binary value pairs (e.g., 0,1 or 1,0) that change binary states to indicate zero crossing events and transitions such as when the BEMF voltage is above the mutual inductance voltage of the DC motor 110. In one example, the monitor circuit 160 includes at least one comparator to monitor at least one phase winding of the DC motor 110 with respect to a common center tap of the motor to generate the feedback.

Typically, the transition detector 144 reads transition pairs (e.g., 0,1) from the monitor circuit 130 at low speeds of the motor 110. When a transition pair changes from one state to another (e.g., 0,1 to 1,0), the processor 120 can initiate a commutate command via the mutual inductance controller 140. As the motor speed increases, the transition detector 144 may detect that the transition pairs are at the same value (e.g., 1,1 or 0,0). The transition detector 144 can then compare such occurrences to a predetermined threshold (e.g., compare counter to a predetermined value). After a predetermined number of like-value pairs, the transition detector 144 can indicate to the processor 120 that a transition from mutual inductance control to BEMF control should occur. At such time, the processor 120 can deactivate the mutual inductance controller 140 and activate the BEMF controller 150 via the switch 160. It is noted that the transition detector 144, the mutual inductance controller 140, the BEMF controller 150, and the switch 160 can all be executed as part of a processor circuit 170, where each of the components can be executed as logical modules of the processor 120. In another example, one or more of the components in the processor circuit 170 can be executed as a separate module (e.g., executable module or hardware module).

Figure 2:
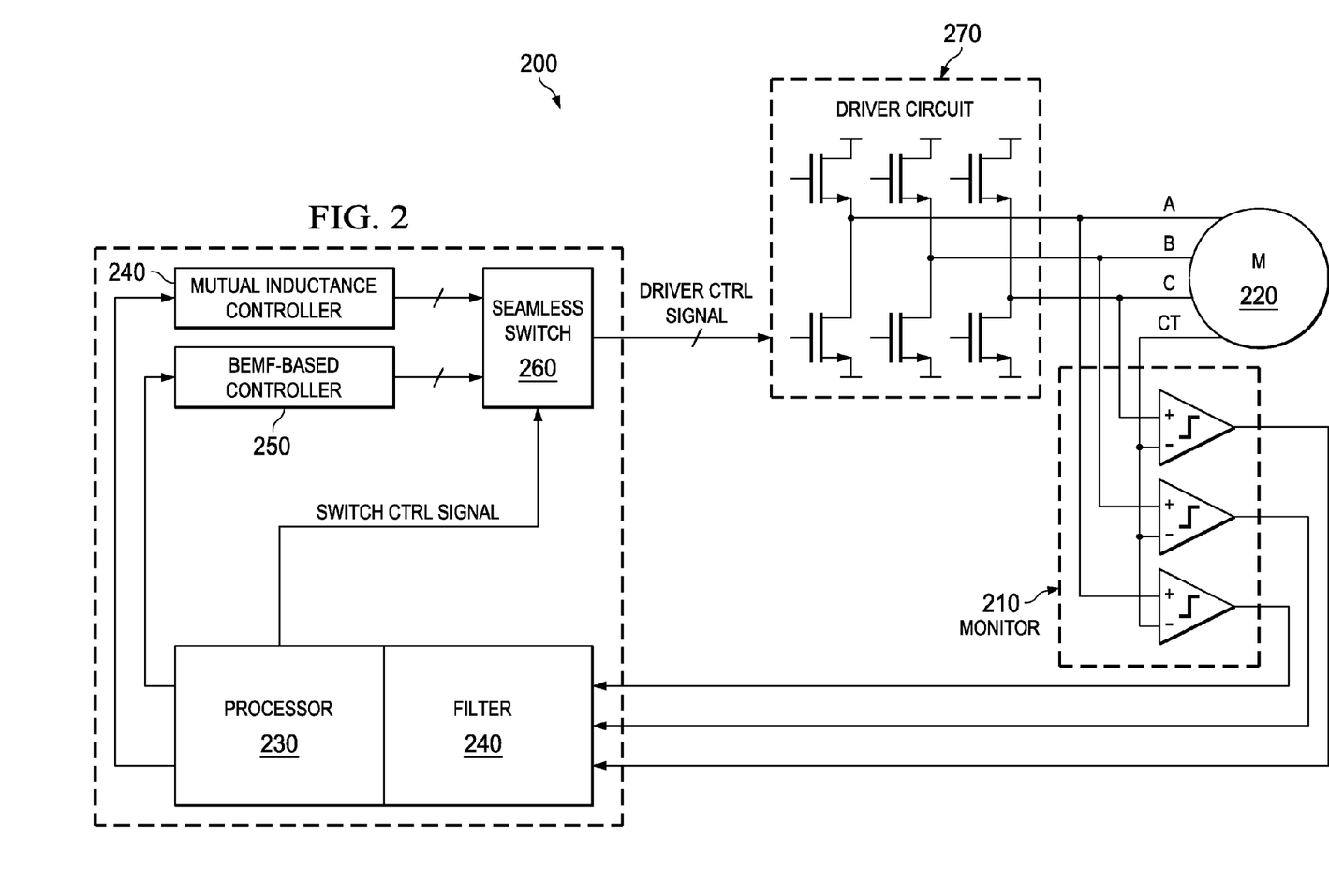
FIG. 2 illustrates an example of an alternative circuit for control of a DC motor.

As will be shown with respect to FIG. 2, the processor circuit 170 can include a low pass filter to filter motor noise received from the monitor circuit 130. In one specific example, the processor circuit 170 can execute digital signal processing to provide the low pass filter although discrete implementations of low pass filters are also possible. Since the feedback is used by the processor circuit 120 in response to controlling the DC motor 110 and as part of an outer control loop for the integrated circuit 100, both the mutual inductance controller 140 and the BEMF controller 150 also operate in a closed control loop manner in response to the feedback received from the monitor circuit 130. As shown, the drive circuit 134 can be operated from the switch 160 to drive the DC motor 110. In one example, the drive circuit 134 can employ having at least one transistor pair to drive the DC motor 110 as will be shown with respect to FIG. 2. The DC motor 110 can be a brushless DC motor having three phase windings, where each of the three phase windings can be connected at a common center tap as will be shown with respect to FIG. 3.

With respect to the BEMF controller 150, Back Electro Magnetic Force (BEMF) is induced by the rotation of a permanent magnet rotor in front of stator winding in the brushless DC motor (BLDC) 110. The BEMF controller 150 relies on BEMF feedback, especially its zero crossing in most cases, to determine a suitable commutation point. The BEMF feedback can be determined by the rotor-stator position and rotor angular velocity. In typical BLDC motors, it can be expressed as a sine function, the amplitude of which is proportional to motor angular velocity or speed. The phase of the sine function is also proportional to motor angular position. By determining the zero crossing of the sine function, the rotor-stator position can be deduced and corresponding driving pattern can be applied by the controller 150 via the switch 160, such that motor 110 can maintain the same torque direction and drive smoothly and efficiently. However, at lower motor speeds, BEMF zero cross detection can be unreliable for stable motor control since the amplitude of the BEMF is low.

To mitigate start-up failure due to low BEMF conditions at start-up, the mutual inductance controller 140 can be utilized. By determining the mutual inductance zero crossing, motor position can be deduced and appropriate commutation can be applied. The mutual inductance induced voltage is significantly larger than background noise and also larger than BEMF feedback when motor speed is low. Thus, at low speed, mutual inductance induced voltage can be employed for commutation. As the motor gains speed, the BEMF feedback value increases proportionally. When BEMF value is large enough for commutation as determined by the transition detector 144, the BEMF value can mask the mutual inductance and the processor 120 can convert to BEMF based commutation where BEMF zero crossings are monitored for motor control. The conversion between controllers is seamless in the sense of smooth driving and consistent torque applied. By using such hybrid control methods at differing motor speeds, motor position can be reliably sensed at low speeds using mutual inductance. At higher speed, BEMF zero crossing can be used for motor position sensing and estimation, for example.

In one example, the circuit 100 can be provided as a circuit (e.g., integrated circuit, discrete circuit, combination of integrated circuit and discrete circuits) for controlling the DC motor 110. Discrete control elements can be provided within the various circuits, for example, for controlling the DC motor 110 and monitoring feedback. This could include a processor operating firmware to control operation of controllers 140 and 150. In another example, the various circuits described herein could be a hard-wired function wherein dedicated logic and switching elements control the DC motor 110. In yet another example, a combination of programmed elements and circuit logic elements could cooperate to control the DC motor 110.

It is noted that the examples described herein can be provided via different analog and/or digital circuit implementations. For instance, in some cases, field effect transistors can be employed and in other cases junction transistors or diodes employed. Some components can be employed as discrete implementations such as a comparator comparing a reference signal to a control signal and in other examples, controllers operating via processor instructions and exchanging data via D/A and A/D converters could be employed to monitor feedback and generate control signals. The circuit 100 can employ various means of monitoring electrical parameters such as monitoring voltage and/or current. It can also employ a microcontroller or other control circuitry capable of digitizing these parameters, storing digital interpretations of these parameters in its memory, and associating acquired values with events in the circuit 100 operation. This includes performing logical and arithmetical operations with the acquired values, for example. In addition, the term controller can be a logical operation capable of being executed as a method in some examples. In other examples, the controller can be hardware modules, software modules, or a combination thereof that can execute instructions to perform control operations. Such hardware and/or software modules can also be configured to perform the methods described herein.

FIG. 2 illustrates an example of an alternative circuit 200 for control of a DC motor. A monitor circuit 200 monitors a pulse width modulated (PWM) on signal and a PWM off signal representing a difference between a mutual inductance voltage and a Back Electromotive Force (BEMF) voltage of a DC motor 220. A processor 230 analyzes the PWM on signal and the PWM off signal from the monitor circuit 210 and determines the difference between the mutual inductance voltage and the BEMF voltage of the DC motor 220. As noted above, this can include utilizing a transition detector (not shown) to determine a transition from mutual inductance control to BEMF control. A mutual inductance controller 240 is activated by the processor 230 to control the DC motor 220 when the BEMF voltage is detected below the mutual inductance voltage of the DC motor. A BEMF controller 250 is activated by the processor circuit 230 when the mutual inductance controller 240 is deactivated and the BEMF voltage is detected above the mutual inductance voltage of the DC motor 220.

As shown, the monitor circuit 220 can include three comparator circuits that monitor three phase windings of the DC motor with respect to a common center tap (CT) of the motor. As noted previously, as two of the phase windings are driven, a floating winding is monitored with respect to the CT of the motor 220. A switch 260 operated by the processor circuit 230 controls a driver circuit 270 that sends drive control pulses to the motor. In one example, the driver circuit can include transistor pairs for each winding of the DC motor 220. The PWM on signal and the PWM off signal to the motor 220 can represent binary value pairs on the floating winding (See FIGS. 4-6) that change binary states to indicate when to commutate during mutual inductance zero crossing and also to detect the transition from when the BEMF voltage is above the mutual inductance voltage of the DC motor. The processor 230 can also include a low pass filter 280 to filter motor noise received from the monitor circuit 210.

As noted above, the comparators in the monitor circuit 220 sample PWM ON time and PWM OFF time of the floating winding to determine a mutual inductance zero crossing and commutate accordingly. By detecting both at PWM on phase (e.g., monitoring floating winding C while driving VAB=VM, where VAB equals voltage across winding AB of motor and VM equals motor voltage) and at PWM off phase (VAB=0). A low BEMF value can thus be "averaged" out from the mutual inductance value. As long as the BEMF voltage is smaller than mutual inductance voltage, the BEMF value should not affect the detection of mutual inductance pulses at low BEMF values. Post digital signal processing can also be performed by the processor 230 to filter out noise from the monitor circuit 210. When the BEMF voltage is large enough, the processor can convert to BEMF zero crossing control mode seamlessly via the switch 260.

The systems and methods described herein provide sampling at PWM ON/OFF times to yield differential results of mutual inductance voltages. This type of sampling and hybrid control improves start up reliability over open loop methods which can be unstable. Initial position sensing is generally not required by the circuit 200. The hybrid control methods described herein enable smooth motor start up without dangling and/or reverse spinning of the DC motor 220. This enables seamless transition to BEMF-based commutation control when the motor speed is determined to be high enough (e.g., above a predetermined counter threshold).

Figure 3:
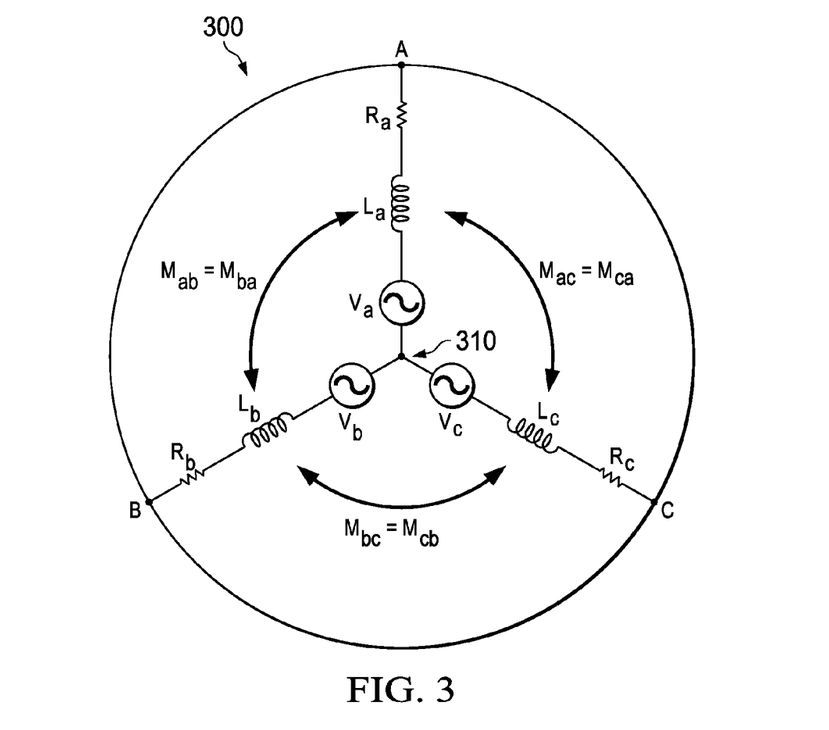
FIG. 3 illustrates an example of a three-phase DC motor.

FIG. 3 illustrates an example of a three-phase DC motor 300. A typical star connected motor 300 can have 4 terminals having 3 phases (A, B, C connection points) and one center tap shown at 310. As shown, each phase can be modeled with a winding resistance, winding inductance and BEMF voltage source, for example. In general, BEMF can be neglected at start up since speed is low. Mutual inductance can be measured between phases. For a six-step driving process for example, two phases can be energized and a third phase floating for example. Output from the drive circuits described above drive each phase of the motor 300. Feedback is measured from each phase with respect to the center tap connection 310. For example, one comparator can measure PWM high and low pulses from a floating or non-driven phase where one input of the comparator monitors the pulses received from the floating phase and the other input of the comparator is referenced to the center tap node 310. Output from the comparators is then received as feedback by the processor circuits and/or filter circuits described above.

Figure 4:
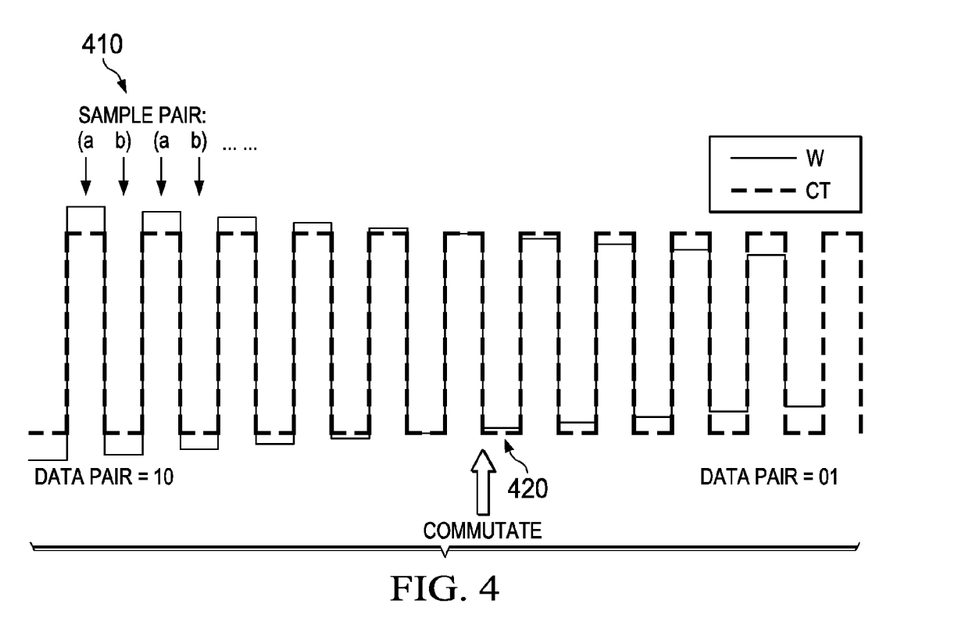
FIGS. 4-6 illustrate an example of pulses that are detected from a DC motor to determine commutation points and transitions between mutual inductance control and BEMF control.
Figure 5:
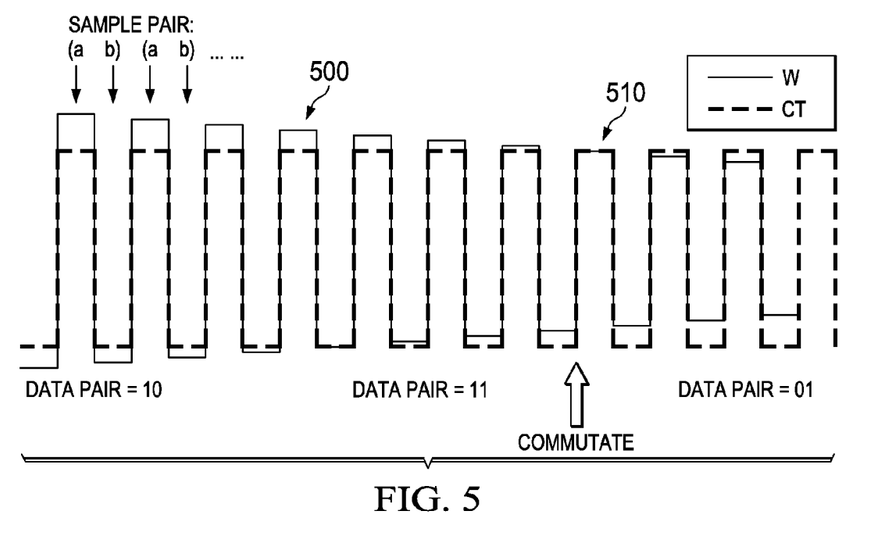
Figure 6:
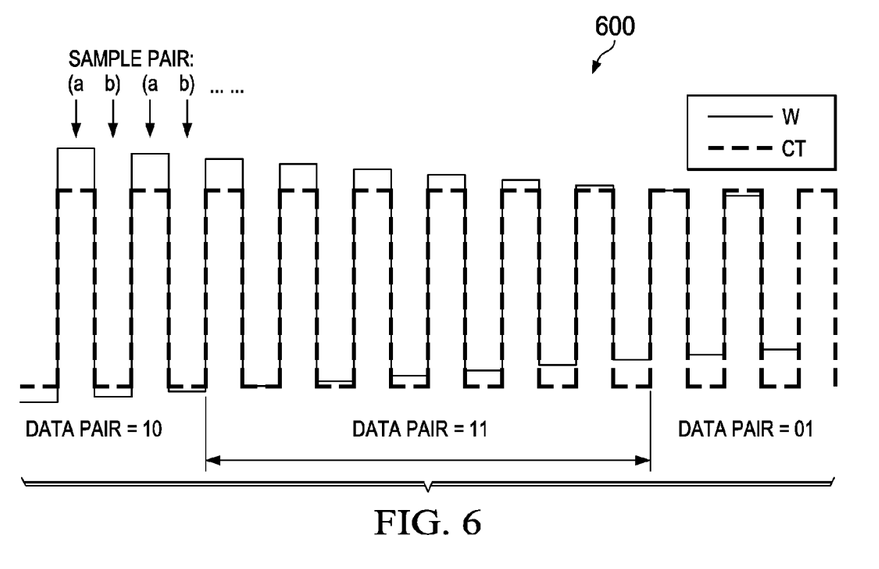

FIGS. 4-6 illustrate an example of pulses that are detected from a DC motor to determine commutation points and transitions between mutual inductance control and BEMF control. FIG. 4 illustrates an example of pulses that are detected from a DC motor to determine motor commutation at lower speeds of the motor. A winding feedback signal (solid line) is shown overlaid on top of the feedback signal received at the center tap connection (e.g., dashed line). As shown at 410, sample pairs of high and low pulses can be received at comparator inputs (See FIG. 2) where the reference input of the comparator monitors the CT voltage feedback and the positive input to the comparator monitors feedback from the respective floating phase winding. Each pair (A, B) (e.g., A representing a sampling when PWM drive signal=high and B representing a sampling when PWM drive=low) can be sampled for their respective binary values. For instance, initially the data pair values may read (1,0) when the solid phase winding voltage is detected above the center tap voltage by the respective comparator. At 420, a transition point is detected where the data pair readings switch from (1,0) to (0,1). At such transitions, a commutation cycle can be initiated for the DC motor. As the motor continues to rotate, the feedback continues to change as the voltage on the floating winding with respect to the center tap continues to change.

With respect to FIG. 5, the received data pairs are detected as (1,1) for several pulses of the motor. In this case, the BEMF voltage is starting to build but the controller is utilizing mutual inductance zero crossing to control position and speed. At 510, when the data pair changes from (1,1) to (0,1) the controller can commutate (reverse polarity to the windings) yet still remain in mutual inductance zero crossing. In order to transition from mutual inductance zero crossing control to BEMF zero crossing control, a counter can be monitored where the number of like-value pairs (e.g., 0,0 or 1,1) can be monitored with respect to a predetermined threshold. When the counter exceeds the threshold, the control can be switched to BEMF zero crossing detection thereafter for continued operations of the motor after startup. At FIG. 6, such transition period between mutual inductance control and BEMF control is illustrated where a like-value data pair (1,1) is received at 600 and continues to be received until 610. At this point, the counter has exceeded a given example threshold and BEMF zero crossing control can then be employed. The BEMF control will subsequently commutate each time the received data pair transitions from (1,0) to (0,1) and so forth thereafter.

Figure 7:
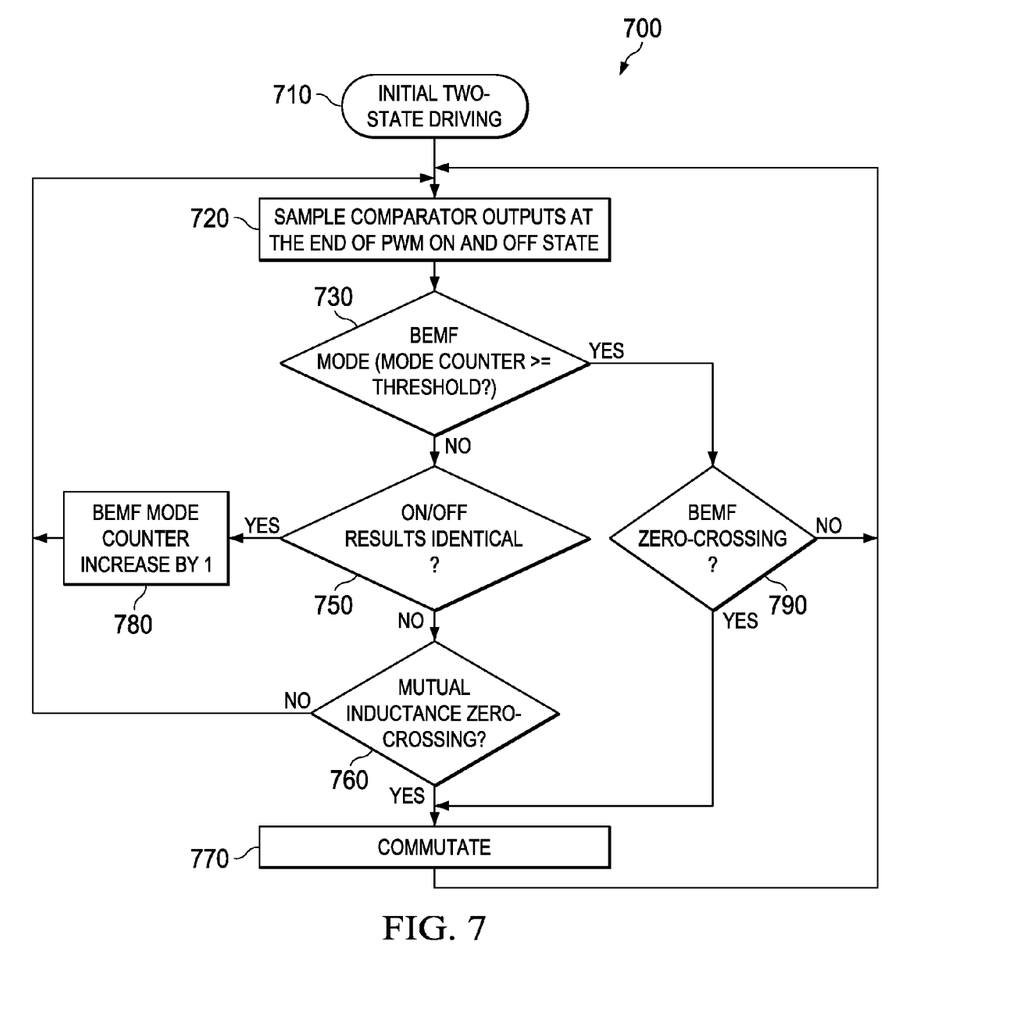
FIG. 7 illustrates a method for controlling a DC motor.

In view of the foregoing structural and functional features described above, a methodology in accordance with various aspects of the disclosure will be better appreciated with reference to FIG. 7. While, for purposes of simplicity of explanation, the methodology of FIG. 7 is shown and described as executing serially, it is to be understood and appreciated that the methods are not limited by the illustrated order, as some aspects could, in accordance with the disclosure, occur in different orders and/or concurrently with other aspects from that shown and described herein. Moreover, not all illustrated features may be required to implement a methodology as described herein.

FIG. 7 illustrates an alternative method 700 for controlling a DC motor. The method 700 includes initiating an initial drive command to start the DC motor at 710. For example, this could include sending a PWM high pulse then a PWM low pulse to a given winding pair (e.g., A and B) while monitoring a floating winding (e.g., C) during the PWM high drive pulse and PWM low drive pulse. At 720, the method 700 samples comparator outputs monitoring the DC motor drive pulses at the end of the PWM on and PWM off state signals (e.g., via monitor circuit 130 of FIG. 1). Although not shown, before (or after) such sampling, the method 700 could impose delays or provide filtering to mask noise received from the motor. At 730, the method 700 determines whether a BEMF counter has equaled or exceeded a predetermined counter threshold indicating that mutual inductance control mode should be activated or BEMF control mode should be active.

At motor startup when mutual inductance predominates, the counter at 730 will not have exceeded the predetermined counter threshold and thus, the method will proceed to 750. At 750, the method 700 determines whether or not there has been a detection of like value pairs (e.g., 1,1 or 0,0). If no like value pairs have been detected at 750, the method proceeds to 760 where a mutual inductance zero crossing decision is determined. If no mutual inductance zero crossing has occurred at 760, the method 700 proceeds back to 720 and prepares for a subsequent feedback sampling. If a mutual inductance zero crossing has been detected at 760 (e.g., pair-value transition from 1,0 to 0,1 indicating mutual inductance zero crossing), the method 700 then proceeds with a commutation cycle to the DC motor at 770 before proceeding back to 720 for more sampling.

Each time the method 700 returns to 750, a determination is made as to whether or not a like value pair has been detected. When a pair such as 1,1 or 0,0 has been detected at 750, a BEMF mode counter is then incremented at 780 where the method then proceeds back to 720. If enough like-value pairs have been detected at 730 where the BEMF mode counter has exceeded a predetermined counter threshold, then the method proceeds to 790 where a BEMF zero crossing is determined. If a transition from 1,0 to 0,1 (or vis versa) is detected at 790 indicating a BEMF zero crossing, then the method proceeds to 770 and initiates a commutation cycle to the motor. If no BEMF zero crossing is detected at 790, then the method proceeds back to 720 for a subsequent sampling. At this point, the method should the remain in BEMF zero crossing detection mode (e.g., unless motor lockup condition detected) since the counter at 730 will have exceed the predetermined threshold.

It is noted that at 770, after a BEMF zero crossing event has been detected at 790, that there may be a predetermined delay added (e.g., delay for 30 degrees of motor travel) invoked at 770 before actual commutation begins at 770. Such delays can be added to move control processing away from the actual zero crossing event where noise can occur. Also, filtering can be applied at 770 to remove high frequency components from the BEMF feedback such as motor noise and/or higher frequency mutual inductance voltages riding on top of the BEMF voltage.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit comprising:
   a processor that analyzes a pulse width modulated (PWM) signal feedback from a brushless DC motor to determine a transition between a mutual inductance zero crossing condition and a Back Electro Motive Force (BEMF) zero crossing condition of the brushless DC motor;
   a mutual inductance controller executed by the processor to commutate the brushless DC motor at startup of the motor when the mutual inductance zero crossing condition is detected by the processor; and
   a BEMF controller executed by the processor to commutate the brushless DC motor after startup of the motor when the BEMF zero crossing condition is detected in the transition by the processor.

2. The circuit of claim 1, further comprising a switch that is activated by the processor to enable the BEMF controller and disable the mutual inductance controller when the transition between the mutual inductance zero crossing condition and the Back Electro Motive Force (BEMF) zero crossing condition of the brushless DC motor is determined.

3. The circuit of claim 2, further comprising a transition detector that is monitored by the processor to determine the transition between the mutual inductance zero crossing condition and the Back Electro Motive Force (BEMF) zero crossing condition of the brushless DC motor.

4. The circuit of claim 3, wherein the transition detector includes a counter that is monitored by the processor with respect to a predetermined counter threshold to determine the transition between the mutual inductance zero crossing condition and the Back Electro Motive Force (BEMF) zero crossing condition of the brushless DC motor.

5. The circuit of claim 4, further comprising a monitor circuit that monitors a floating phase winding of the brushless DC motor after PWM on signals and PWM off signals to the motor to generate feedback comprising transition pairs of (1,0) or (0,1), or feedback comprising like-value pairs of (0,0) or (1,1), where the transition pairs are employed to detect mutual inductance zero crossing events and the like-value pairs are employed to detected the transition between the mutual inductance zero crossing condition and the BEMF zero crossing condition of the brushless DC motor.

6. The circuit of claim 5, wherein the monitor circuit provides feedback to the mutual inductance controller and the BEMF controller and includes at least one comparator to monitor the floating phase winding with respect to a center tap connection to the brushless DC motor.

7. The circuit of claim 6, further comprising a low pass filter to filter motor noise received from the monitor circuit.

8. The circuit of claim 6, wherein the processor circuit executes digital signal processing to provide the low pass filter.

9. The circuit of claim 1, further comprising a drive circuit having at least one transistor pair to drive the brushless DC motor.

10. A method comprising:
    sampling a pulse width modulated (PWM) signal on time and a PWM signal off time to determine a transition between a mutual inductance zero crossing and a Back Electromotive Force (BEMF) zero crossing of a brushless DC motor;
    enabling a mutual inductance mode to operate the brushless DC motor when the mutual inductance zero crossing of the brushless DC motor is detected; and
    switching from the mutual inductance mode to a BEMF mode to operate the brushless DC motor when the BEMF zero crossing of the brushless DC motor is detected in the transition.

11. The method of claim 10, further comprising monitoring a counter with respect to a predetermined counter threshold to determine the transition between the mutual inductance zero crossing and the Back Electro Motive Force (BEMF) zero crossing of the brushless DC motor.

12. The method of claim 11, further comprising monitoring a floating phase winding of the brushless DC motor to generate feedback comprising transition pairs of (1,0) or (0,1), or feedback comprising like-value pairs of (0,0) or (1,1).

13. The method of claim 12, further comprising utilizing the transition pairs to detect mutual inductance zero crossing events and determine when to commutate the brushless DC motor.

14. The method of claim 12, further comprising utilizing the like-value pairs to detect the transition between the mutual inductance zero crossing and the Back Electro Motive Force (BEMF) zero crossing of the brushless DC motor.

15. The method of claim 12, further comprising utilizing a low pass filter to filter motor noise received from the feedback.

16. A circuit comprising:
    a monitor circuit to monitor a pulse width modulated (PWM) on signal and a PWM off signal representing a transition between a mutual inductance zero crossing and a Back Electromotive Force (BEMF) zero crossing of a brushless DC motor;
    a processor to analyze the PWM on signal and the PWM off signal from the monitor circuit and determine the transition between the mutual inductance zero crossing and the BEMF zero crossing of the brushless DC motor;
    a mutual inductance controller that is activated by the processor to control the brushless DC motor when the mutual inductance zero crossing is detected; and
    a BEMF controller that is activated by the processor when the BEMF zero crossing is detected in the transition.

17. The circuit of claim 16, further comprising a transition detector that is monitored by the processor to determine the transition between the mutual inductance zero crossing condition and the Back Electro Motive Force (BEMF) zero crossing condition of the brushless DC motor.

18. The circuit of claim 17, wherein the transition detector includes a counter that is monitored by the processor with respect to a predetermined counter threshold to determine the transition between the mutual inductance zero crossing condition and the Back Electro Motive Force (BEMF) zero crossing condition of the brushless DC motor.

19. The circuit of claim 18, wherein the monitor circuit monitors a floating phase winding of the brushless DC motor after PWM on signals and PWM off signals to the motor to generate feedback comprising transition pairs of (1,0) or (0,1), or feedback comprising like-value pairs of (0,0) or (1,1), where the transition pairs are employed to detect mutual inductance zero crossing events and the like-value pairs are employed to detected the transition between the mutual inductance zero crossing condition and the BEMF zero crossing condition of the brushless DC motor.

20. The circuit of claim 19, wherein the monitor circuit provides feedback to the mutual inductance controller and the BEMF controller and includes at least one comparator to monitor the floating phase winding with respect to a center tap connection to the brushless DC motor.

* * * * *